US012803943B2

(12) United States Patent
Flester

(10) Patent No.: US 12,803,943 B2
(45) **Date of Patent: *Nov. 17, 2026**

(54) VERIFICATION OF SELECTED INBOUND ELECTRONIC MAIL MESSAGES

(71) Applicant: CLOUDFLARE, INC., San Francisco, CA (US)

(72) Inventor: Michael J. Flester, Highland, MD (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,875

(22) Filed: Apr. 1, 2024

(65) Prior Publication Data

US 2024/0250926 A1 Jul. 25, 2024

Related U.S. Application Data

(63) Continuation of application No. 18/153,059, filed on Jan. 11, 2023, now Pat. No. 11,949,641.

(60) Provisional application No. 63/298,552, filed on Jan. 11, 2022.

(51) Int. Cl.
*H04L 51/212* (2022.01)
*G06F 21/31* (2013.01)

(52) U.S. Cl.
CPC .......... *H04L 51/212* (2022.05); *G06F 21/313* (2013.01)

(58) Field of Classification Search
CPC ..... H04L 51/212; H04L 51/214; H04L 51/42; H04L 51/52; H04L 51/58; H04L 51/48; H04L 51/04; H04L 51/224; H04L 67/306; G06Q 10/107
See application file for complete search history.

(56) References Cited

U.S. PATENT DOCUMENTS

| | | | | |
|---|---|---|---|---|
| 6,321,267 B1 * | 11/2001 | Donaldson | H04L 51/212 | 709/227 |
| 6,868,498 B1 * | 3/2005 | Katsikas | G06Q 10/107 | 715/752 |
| 7,249,175 B1 * | 7/2007 | Donaldson | G06Q 10/107 | 709/225 |
| 7,310,660 B1 * | 12/2007 | White | H04L 63/1408 | 709/206 |
| 7,831,672 B2 * | 11/2010 | Tsai | G06F 21/554 | 709/224 |
| 8,209,758 B1 * | 6/2012 | Doukhvalov | H04L 67/306 | 726/25 |
| 8,214,904 B1 * | 7/2012 | Doukhvalov | G06Q 10/00 | 726/26 |

(Continued)

*Primary Examiner* — Ninos Donabed
(74) *Attorney, Agent, or Firm* — NICHOLSON DE VOS WEBSTER & ELLIOTT LLP

(57) ABSTRACT

An email verification system is described. The email verification system stores names and associated email addresses. An email is received that has a sender name and a sender email address. If the email verification system determines that the sender name matches a stored name but the sender email address does not match with an email address associated with the stored name, the email is prevented from being transmitted to its recipient unless the email is verified as being legitimate. The email verification system transmits a request to verify the email via a configured verification method. If a response is received that verifies the email as legitimate, the email is delivered; otherwise the email is blocked.

24 Claims, 5 Drawing Sheets

(56) References Cited

U.S. PATENT DOCUMENTS

| | | | | |
|---|---|---|---|---|
| 8,214,905 | B1 * | 7/2012 | Doukhvalov | H04L 63/20 726/24 |
| 9,177,293 | B1 * | 11/2015 | Gagnon | H04L 51/212 |
| 2005/0015626 | A1 * | 1/2005 | Chasin | H04L 63/0245 726/4 |
| 2006/0277264 | A1 * | 12/2006 | Rainisto | H04L 51/212 709/206 |
| 2007/0128899 | A1 * | 6/2007 | Mayer | G06F 9/4406 439/152 |
| 2008/0177994 | A1 * | 7/2008 | Mayer | G06F 16/00 709/224 |
| 2011/0264684 | A1 * | 10/2011 | Shafigi | G06F 16/23 707/769 |
| 2012/0084860 | A1 * | 4/2012 | Cao | H04L 63/1441 726/23 |
| 2012/0099689 | A1 * | 4/2012 | Mahkonen | H04L 43/087 375/371 |
| 2012/0173609 | A1 * | 7/2012 | Kulaga | H04L 63/0218 709/203 |
| 2013/0227078 | A1 * | 8/2013 | Wei | H04L 67/02 709/224 |
| 2015/0019402 | A1 * | 1/2015 | Berlin | G06Q 20/24 705/38 |
| 2015/0134694 | A1 * | 5/2015 | Burke | G06F 16/245 707/769 |
| 2016/0019491 | A1 * | 1/2016 | Arlia | G06Q 10/063112 705/7.14 |
| 2017/0068963 | A1 * | 3/2017 | Saxena | G06Q 30/016 |
| 2018/0227218 | A1 * | 8/2018 | Thubert | H04L 45/128 |
| 2018/0350180 | A1 * | 12/2018 | Onischuk | G07C 13/00 |
| 2019/0205148 | A1 * | 7/2019 | Schur | G06F 9/453 |
| 2019/0205998 | A1 * | 7/2019 | Schur | G06Q 10/40 |
| 2023/0019180 | A1 * | 1/2023 | de Nijs | G06F 16/24568 |

* cited by examiner

200

VERIFICATION OF SELECTED INBOUND ELECTRONIC MAIL MESSAGES

CROSS-REFERENCE TO RELATED APPLICATIONS

This application is a continuation of U.S. application Ser. No. 18/153,059, filed Jan. 11, 2023, which claims the benefit of U.S. Provisional Application No. 63/298,552, filed Jan. 11, 2022, which is hereby incorporated by reference.

FIELD

Embodiments of the invention relate to the field of computer security; and more specifically, to the verification of selected inbound electronic mail messages.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Email scam attacks or email fraud attacks are intentional, deceptive efforts for either financial gain or to cause damage to another individual or account by means of email. Examples of such scam attacks are phishing, business email compromise (BEC) attacks, spoofing, or man-in-the-middle attacks. Such an email scam may exploit the fact that emails are frequently used to conduct both personal and professional businesses. For example, an email scam may impersonate a trusted business partner of the email recipient or an individual or account that is trusted by the email recipient, with the goal of defrauding the recipient. An email scam may involve the use of fake invoices and bills, fake requests to send money or non-currency forms of monetary value such as gift cards, or fake requests to disclose sensitive information.

An email scammer may target a particular recipient who may be an individual or an employee of a large organization, or an account associated with one of them. An email scammer may obtain legitimate email addresses of employees, officers, or directors from public sources. For example, a nonprofit corporation, seeking to provide transparency to the public, might publish a directory of officers such as President, Vice President, Treasurer, and so forth, with real names and email addresses at the organization. Through a grooming period of email exchanges, the email scammer builds trust with the targeted recipient such that when the email scammer finally sends the targeted recipient an email that requests something of value, such as money, a non-currency funds transfer, or sensitive information, the targeted recipient has been led to believe that they have been communicating with one of their normal business partners and are sending the requested item to a familiar account as part of a normal routine.

Email scammers are often highly sophisticated enterprises. If the fraud attempt succeeds and is not discovered quickly, the fraudulently obtained asset may be hard to recover because it likely has been filtered through other accounts that are difficult to trace.

While business losses from the foregoing can be thousands to millions of dollars or other denomination, the relevant technical problem is that email messages of the types described above can pass through existing mail transfer agents, malware filters, firewalls, and other devices or software without being blocked, flagged, or held in a quarantine. The electronic digital transmission of such a message into an enterprise network, alone, is a technical problem because the message consumes technical resources such as CPU cycles, storage, memory, and network bandwidth that do not need to be used. Existing computer security tools are believed to be inadequate to address the foregoing problems and there is an acute need in the computer security field for a technical solution to the problem of detecting and blocking email messages that constitute email scam attacks.

SUMMARY

An email verification system is described. The email verification system stores names and associated email addresses. An email is received that has a sender name and a sender email address. If the email verification system determines that the sender name matches a stored name but the sender email address does not match with an email address associated with the stored name, the email is prevented from being transmitted to its recipient unless the email is verified as being legitimate. The email verification system transmits a request to verify the email via a configured verification method. If a response is received that verifies the email as legitimate, the email is delivered; otherwise the email is blocked.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
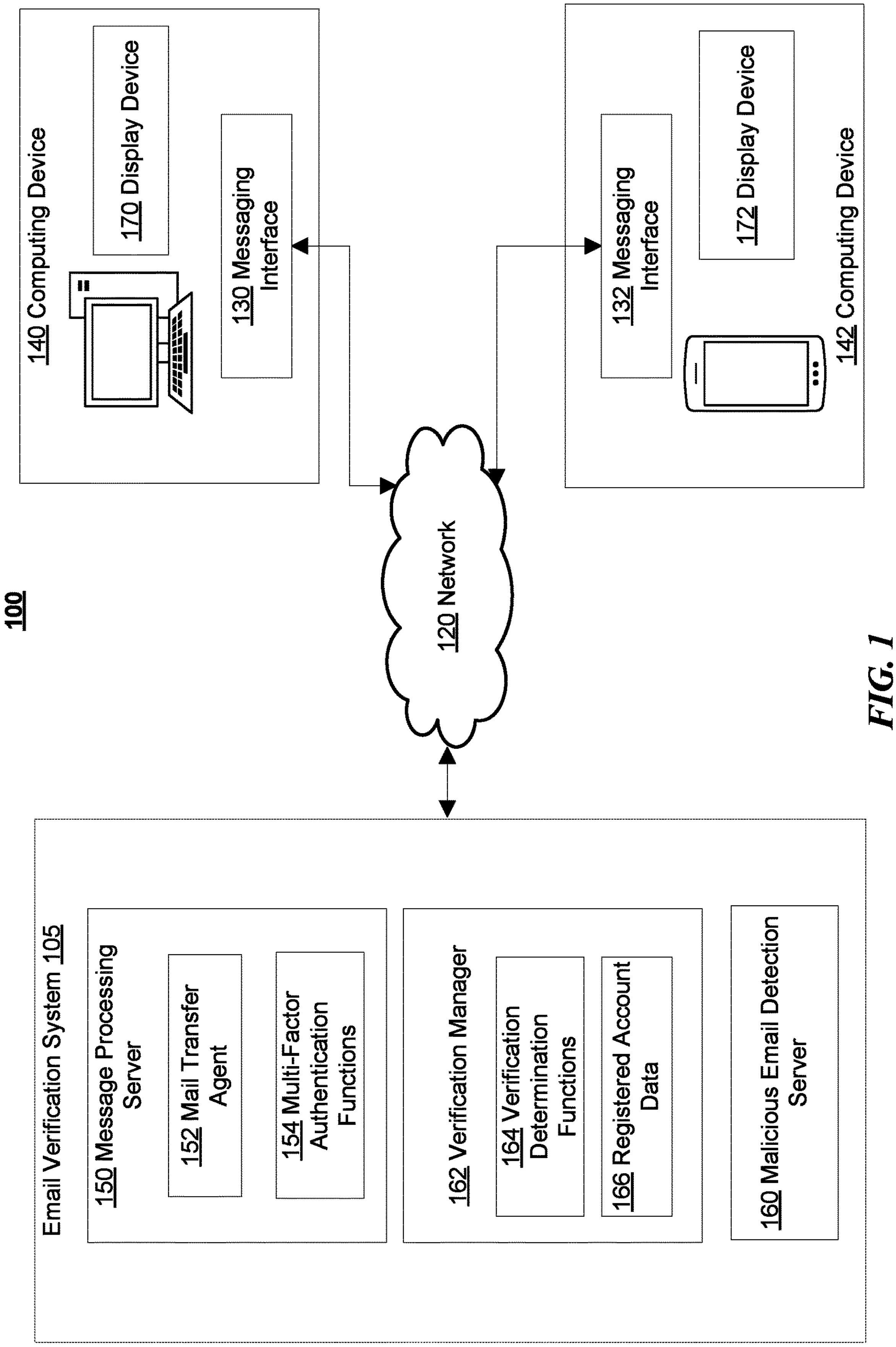
FIG. 1 is a block diagram that depicts an example system that may be used to implement an embodiment for verification of selected inbound email.

Verification of selected inbound electronic mail messages (email) is described. An inbound email with certain attributes, characteristics, and/or message content is held for verification. The verification includes a registered user verifying that the email is legitimate (e.g., not malicious or part of a scam). The email is delivered to the intended recipient after the email is confirmed as being legitimate.

In an embodiment, a mail transfer agent (MTA) or other trusted gateway of the email verification system analyzes incoming email using heuristics, algorithms, signatures, and/or rules, and flags selected emails (e.g., suspicious emails and/or important emails) for verification. Examples include email purporting to be from an executive or manager that has not been sent from a registered or known email address; invoices, confidential documents, or other critical business information purporting to be sent from a vendor, supplier, or similar entity that were not sent from a registered or known email address.

As an example, the email verification system may register an association of names and email addresses (e.g., John Doe,johndoe@example.com). The email verification system may identify and hold an incoming email for verification if that email has a sender name that matches a registered name (e.g., John Doe) but the sender email address does not match an email address in the corresponding name and email address association. For example, the email has a sender name of John Doe, which matches a registered name, but the email has a sender email address of john.doe@example2.com, which does not match an email address stored in association with the sender name John Doe. Such a mismatch is sometimes referred herein as a sender mismatch. Such a mismatch of information may be indicative of an attack email or may be an innocuous mismatch (e.g., a user using their personal email address to send a work email message). Such an email is not delivered to the recipient email address until the email is verified as being legitimate (e.g., not malicious or part of a scam). A request to verify the email may be sent via a configured verification method (which can belong to the registered name that matches the sender name of the email and/or other authorized user) such as to an email address (e.g., the email address associated with the registered name that matches the sender name of the email or a different email address that belongs to an authorized user), a text message, a phone call, or a verification application. The verification request is not sent to the original sender who may be an attacker. If the email verification system receives a response that indicates the email is legitimate, the email is sent to the intended recipient. If the email verification system receives a response that the email is illegitimate, or does not receive a response, the email verification system blocks the email from being sent to the intended recipient. Using the above example, an email that is received with a sender name of John Doe with a sender address of john.doe@example2.com may be held for verification and a verification request may be transmitted via a configured verification method associated with the email johndoe@example.com.

As another example, the email verification system may identify and hold an incoming email for verification if it has been determined that the email includes an invoice, a confidential document or confidential information, and/or other matches against prescribed patterns or models. Such an email is not delivered to the recipient email address until the message is verified as being legitimate (e.g., not malicious or part of a scam). A request to verify the email may be sent via a configured verification method. The verification request is not sent to the original sender who may be an attacker. If the email verification system receives a response that indicates the email is legitimate, the email is sent to the intended recipient. If the email verification system receives a response that the email is illegitimate, or does not receive a response, the email verification system blocks the email from being sent to the intended recipient.

In the above examples, the email verification system may not perform the verification if the sender is on an approved sender list (e.g., the particular sender email address and/or the sender domain). The approved sender list may be applicable domain wide (e.g., emails received from a particular sender may be sent to all email addresses at the recipient domain without requiring verification) or to selective email addresses or groups (e.g., emails received from a particular sender may be sent to specific email address(es) at the recipient domain without requiring verification and emails received from that sender to other email address(es) at the recipient domain will require verification). For instance, if the email address john.doe@example2.com is on an approved sender list, an email with the sender name of John Doe (matching a registered sender name) with the sender email address being john.doe@example2.com, the email may be delivered to the intended recipient without requiring verification. As another example, if the email address vendor@example3.com is on an approved sender list, an email from that email address may be sent to the intended recipient without verification even if that email includes an invoice, confidential information, and/or other matches against prescribed patterns or models.

As another example, the email verification system may identify and hold an incoming email if there is a sender mismatch and/or a mismatch of a recipient name with the recipient email address (e.g., the email includes a recipient name that matches a registered name but the corresponding email address does not match the corresponding registered email address). Such an email may be part of an attack where an attacker spoofs the header To field, the header From field, and/or the envelope From field, (and CC, or include as another recipient in the To header the target of the attack) and has an email conversation that appears legitimate in an attempt to cause the target of the attack to take some action. Such an email is not delivered to the recipient email address until the message is verified as being legitimate (e.g., not malicious or part of a scam). A request to verify the email may be sent via a configured verification method (which can belong to a registered name that matches the sender name of the email and/or other authorized user). The verification request is not sent to the original sender who may be an attacker. The verification request may be like the other verification requests described herein. If the email is verified as being legitimate, the email is sent to the intended recipient. If the email is not verified as being legitimate or has been indicated as being illegitimate, the email is not sent to the intended recipient.

As another example, the email verification system may identify and hold an email if the content of the email meets certain criteria (e.g., is determined to include confidential information by a machine learning model). Such an email is not delivered to the recipient email address until the message is verified as being legitimate (e.g., not malicious or part of a scam). A request to verify the email may be sent via a configured verification method (which can belong to an authorized user). The verification request is not sent to the original sender who may be an attacker. The verification request may be like the other verification requests described herein. If the email is verified as being legitimate, the email is sent to the intended recipient. If the email is not verified as being legitimate or has been indicated as being illegitimate, the email is not sent to the intended recipient.

The request to verify the email may include various information about the email including one or more of: the sending IP address, the sending autonomous system number (ASN), the value in the envelope From field, the recipient(s) email address(es), the date and time of the email, the subject of the email, whether the email passed DMARC, attachment name(s), and model scoring. The request to verify may include a preview of the email content. The request may include a way to verify the email as legitimate and/or indicate that the email is illegitimate.

Certain embodiments provide an MTA that incorporates verification for emails. If, for example, an incoming email to an account or entity meets certain criteria, then it can be held in queue and a verification request can be sent to a phone or other device. If the verification request is positively acknowledged and approved, then the email can be delivered normally. If the verification request is declined, or receives no response, then the email can be blocked and/or quarantined.

FIG. 1 is a block diagram that depicts an example system that may be used to implement an embodiment for verification of selected inbound email. The system 100 includes the email verification system 105, the network 120, and the computing devices 140 and 142. The email verification system 105 includes the message processing server 150, the verification manager 162, and optionally the malicious email detection server 160, in the transmission of electronic messages from upstream computers to downstream computers that can send/receive emails. The email verification system 105 and the computing devices 140 and 142 are communicatively coupled to an electronic communications network 120 via for example wired, wireless, and/or optical connections. Display devices 170, 172 are communicatively coupled to computing devices 140, 142, respectively.

The message processing server 150 implements a mail transfer agent (MTA) 152 that receives email and passes it to a host storage system, such as corporate email servers, for example, MICROSOFT OFFICE 365, or GOOGLE GSUITE. Enterprises or entities that want to use such a service can configure their DNS records to point to the message processing server 150. Since such a service executes as a legitimate "man in the middle" for email messages, it can delay the delivery of email based on rules and criteria. An example is when an email appears suspicious because it purports to attach an invoice from unknown infrastructure. The MTA 152 controls the transmission of electronic communications between upstream computers and downstream computers, such as the computing devices 140, 142, on network 120. Portions of the MTA 152 may be implemented as or in combination with a text messaging service such as SMS or MMS (Multimedia Messaging Service), or as a Voice over Internet (VOIP) server or as a mail server of a public or private electronic mail or messaging system. Portions of the MTA 152 may be implemented in an online service, such as a social network service, in which electronic messages may include notifications, recommendations, shares, comments, news feeds, tweets, and/or connection requests. The MTA 152 may include various message scanning and filtering technologies, such as virus scanners, intrusion detection systems, and/or spam filters. In an embodiment, the MTA 152 is programmed to use stateless security scanning to scan messages as they are in transit from an upstream computer to one or more downstream computers.

Figure 5:
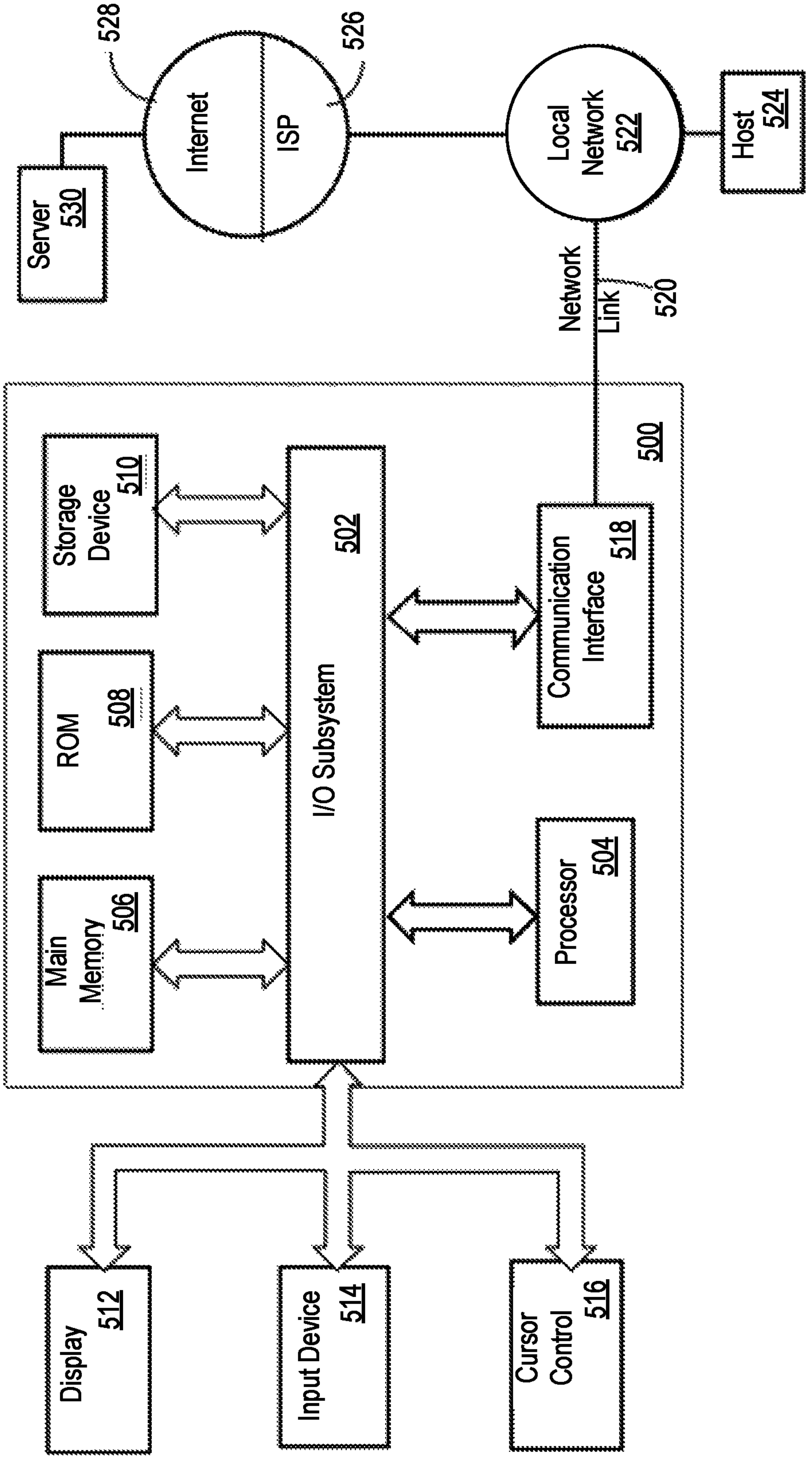
FIG. 5 is a block diagram that illustrates a computer system upon which an embodiment of the present invention may be implemented.

The computing devices 140 and 142 are each a client-side computing device or set of cooperating computing devices, such as a smartphone, tablet computer, wearable or body-mounted device, smart appliance, laptop machine, or combination of any of such devices. Messaging interfaces 130 and 132 are each client-side messaging software such as a mail client or a messaging application, which reside in memory of computing devices 140 and 142 respectively. Malware attacks and other security risks can occur during the transmission of messages or during the download of electronic content from the Internet. Messaging interfaces 130,132 cooperate with display devices 170, 172, respectively, to provide graphical user interfaces through which electronic messages can be received, displayed, read, managed, composed, and sent, via human interaction with input and output device(s) of computing devices 140, 142. Examples of input and output device(s) and other components of computing devices and servers are shown in FIG. 5, described below. Portions of messaging interfaces 130 and 132 may be hosted by a hosting computer (not shown) on the network 120.

The network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. A network 120 may include a combination of networks, such as a combination of wired and wireless networks, as needed to enable communications between the computing devices and servers.

The malicious email detection server 160, which is optional in some embodiments, is programmed to determine whether messages scanned by the message processing server 150 are malicious email messages, for example, scam email, and provide output indicating the determination to the message processing server 150 and/or the verification manager 162. For example, if the malicious email detection server 160 determines that a particular message is a malicious message, the malicious email detection server 160 is programmed to provide output to the message processing server 150 indicating that the particular message is a malicious message. In an embodiment, a malicious email detection server 160 is programmed to determine whether a particular message is a malicious message based on a set of rules and heuristics that are applied to message's characteristics, attributes, and message content. The rules and heuristics applied by the malicious email detection server 160 may be manually configured and/or configured by an automated process, in accordance with the requirements of a particular implementation. Based on the results of such technique, the malicious email detection server 160 is programmed to make a determination as to the probability that a particular message is, or is not, a scam email (for example, a phishing attempt, spoofed email, or business email compromise email). Then, the malicious email detection server 160 may be programmed to provide the output of the determination to the message processing server 150 and/or the verification manager 162. In an embodiment, the message processing server 150 and/or the verification manager 162 may be programmed to block, re-route, modify, or delay the transmission of the message to the recipient computer system if the malicious email detection server 160 indicates that the message has been determined as malicious.

The verification manager 162 is programmed to analyze the messages scanned by the message processing server 150 to determine whether the messages should be flagged for verification as a prerequisite for delivery to their intended recipient(s). For instance, the verification manager 162 may use the verification determination functions 164 to analyze an inbound email and if that email has certain attributes, characteristics, and/or message content, the verification manager 162 may hold that email for verification. As an example, the attributes, characteristics, and/or message content may indicate that the email is suspicious or important. An "important" email in this context may be if the email is received from, or sent to, an account associated with an individual who is responsible for sending/receiving invoices or other important communications, or an account with an authoritative power to act on a behalf of an organization for any matter. "Account," in this context, refers to a digitally stored set of metadata that describes a computer, entity, user, individual, or set of credentials for any of the foregoing. A "suspicious" email in this context may be determined if the malicious email detection server 160 has determined that the probability of the email being a malicious email is above a certain, minimum threshold and/or based on an execution of the verification determination functions 164.

The verification determination functions 164 are sets of executable instructions that have been programmed to execute, when called, functions that analyze the message's characteristics, attributes, and message content and compare to the registered account data 166. The registered account data 166 represents data associated with accounts, or identifiers of computers, accounts, or individuals, of an organization. The registered account data 166 includes, for each registered account, account identifying data such as a username, computer identifier, computer address, or another unique account identifier; an email address to which malicious messages to the account would be directed; and one or more preferred methods of verification. In some embodiments, the registered account data 166 includes, for each account, a single preferred method of verification; in other embodiments the registered account data 166 includes, for each account, an ordered list of multiple methods of verification in an order of preference. The registered account data 166 can be keyed to or based upon usernames, account names, hash values calculated over account credentials, computer names or identifiers, or network addresses of end stations. The registered account data 166 can be stored in a database maintained by the malicious email detection server 160, the verification manager 162, or other component of the email verification system 105.

Methods of verification define how the verification is performed and what is required to verify an email. Methods of verification may include, but are not limited to, text message verification, voice call verification, email verification (e.g., email transmission of a verification code), verification through an authentication application, or others, depending on the capability of client computing devices that are associated with various accounts. A verification method may use the capability of a multi-factor authentication method. For example, some methods may require a cellular phone number capable of responding to a multi-factor authentication message request via Short Message Service (SMS) or a multi-factor authentication application configured to execute on a client device associated with an account or individual. To verify an email using such a verification method, the user may be required to input a code into a verification interface that is displayed on their multi-factor authentication method (e.g., text message, authenticator application). To identify one or more methods, registered account data 166 can store or include numeric values, key values, or alphanumeric values that identify, to program code that implements the processes herein, the particular methods.

The registered account data 166 can be configured by an organization that is using the email verification system. The registered account data 166 can include account data that is internal to the organization and/or account data that is external to the organization. As an example of internal account data, the registered account data 166 may include account(s) that are associated with individual(s) that are likely to be a possible target of an attack and/or has a sensitive role at an organization. Examples of such individuals can include managers, executives, financial, legal, and/or others that have authoritative power to act on behalf of the organization. As an example of external account data, the registered account data 166 may include account(s) that are associated with individual(s) that represent vendors, suppliers, or professional services organizations, such those that are responsible for sending/receiving invoices or other important communications.

The registered account data may include an approved sender list that specifies senders (e.g., the particular sender email address and/or sender domain) for which the email verification is not performed. The approved sender list may be applicable domain wide (e.g., emails received from a particular sender may be sent to all email addresses at the recipient domain without requiring verification) or to selective email addresses or groups (e.g., emails received from a particular sender may be sent to specific email address(es) at the recipient domain without requiring verification and emails received from that sender to other email address(es) at the recipient domain will require verification). For instance, if the email address john.doe@example2.com is on an approved sender list, an email with the sender name of John Doe (matching a registered sender name) with the sender email address being john.doe@example2.com, the email may be delivered to the intended recipient without requiring verification. As another example, if the email address vendor@example3.com is on an approved sender list, an email from that email address may be sent to the intended recipient without verification even if that email includes an invoice, confidential information, and/or other matches against prescribed patterns or models.

In an embodiment, the verification manager 162 may be programmed to determine, via execution of verification determination functions 164, whether a particular email is to be held for verification by comparing the message's characteristics, attributes, or message content with the registered account data 166. For example, the verification manager 162 may determine to hold an email for verification if that email has a sender name that matches a registered sender name of an account but the sender email address does not match an email address in the corresponding account (a sender mismatch). Such a mismatch of information may be indicative of an attack email or may be an innocuous mismatch (e.g., a user using their personal email address to send a work email message). As another example, the verification manager 162 math determine to hold an email for verification if there is a sender mismatch and/or a mismatch of a recipient name with the recipient email address (e.g., the email includes a recipient name that matches a registered name but the corresponding email address does not match the corresponding registered email address). Such an email may be part of an attack where an attacker spoofs the header To field, the header From field, and/or the envelope From field, (and CC, or include as another recipient in the To header the target of the attack) and has an email conversation that appears legitimate in an attempt to cause the target of the attack to take some action. As another example, the verification manager 162 may determine to hold an email for verification if it has been determined that the email includes an invoice, a confidential document or confidential information, and/or other matches against prescribed patterns or models. As another example, the verification manager 162 may identify and hold an email if the content of the email meets certain criteria (e.g., is determined to include confidential information by a machine learning model). As yet further example, the verification manager may determine to hold an email for verification if a malicious email detection server 160 has determined that the probability of the message being a malicious email is above a certain, minimum threshold.

After determining an email should be held for verification, the verification manager 162 provides an output message to the MTA 152 to execute the verification functions 154. The verification functions 154 can include code to implement, for example, a text message, a voice call, an email to an email address (e.g., a registered email address), or a verification application. In the example of FIG. 1, executable code for the verification functions 154 is integrated into the message processing server 150; in other embodiments, verification functions can execute via calls to external libraries, servers, or services, and integration as shown in FIG. 1 is not required.

When the MTA 152 is instructed to execute a verification function, the MTA 152 may be programmed to send a verification request to a client device associated with a registered account via a preferred method of verification specified in registered account data 166. The verification request may be sent via a text message, a phone call, an email (e.g., to the email address associated with the registered name that matches the sender name of the email, or a different email address that belongs to an authorized user), or a verification application. The verification request is not sent to the original sender who may be an attacker. The request to verify the email may include various information about the email including one or more of: the sending IP address, the sending autonomous system number (ASN), the value in the envelope From field, the recipient(s) email address(es), the date and time of the email, the subject of the email, whether the email passed DMARC, attachment name(s), and model scoring. The request to verify may include a preview of the email content. The request may include a way for the recipient of the request to verify the email as legitimate and/or indicate that the email is illegitimate.

If a verification is initiated for a particular email and the verification is successful (for example, the account verifies successfully through text or application), the MTA 152 may be programmed to send the message to a recipient computer by forwarding the message to a next-hop router or other downstream computer or element of network infrastructure gear. If a verification process is initiated for a particular email but the verification fails (for example, the account fails to verify or does not respond in time), then MTA 152 may be programmed to delay or block the message from being sent to a recipient computer, or alternatively re-route or quarantine the message.

In an embodiment, the MTA 152 transmits a network instruction when verification fails. The network instruction can be performed by a network device such as a mail server or a router executing the network instruction to drop the message, transmit configuration data to a firewall or router, or reroute the message to a different machine. For example, the network instruction may be to modify, delay, block, re-route or forward a message to downstream routers, message transfer agents or other network nodes. An instruction to modify a message may include an instruction to add a notification flag to the message before sending the message downstream; for example, a "SUSPECTED PHISHING" notification added to the subject line of the message, or to re-direct or quarantine the message containing the link, for example by routing the message to a honeynet or quarantine services.

In an embodiment, the verification manager 162 resides within a malicious email detection server 160. In another embodiment, the verification manager 162 resides within a message processing server 150. In other embodiments, the verification manager 162 resides external to the malicious email detection server 160 and the message processing server 150. The functions of the message processing server 150, the malicious email detection server 160, and/or the verification manager 162 can be performed on the same physical device or multiple physical devices.

Figure 2:
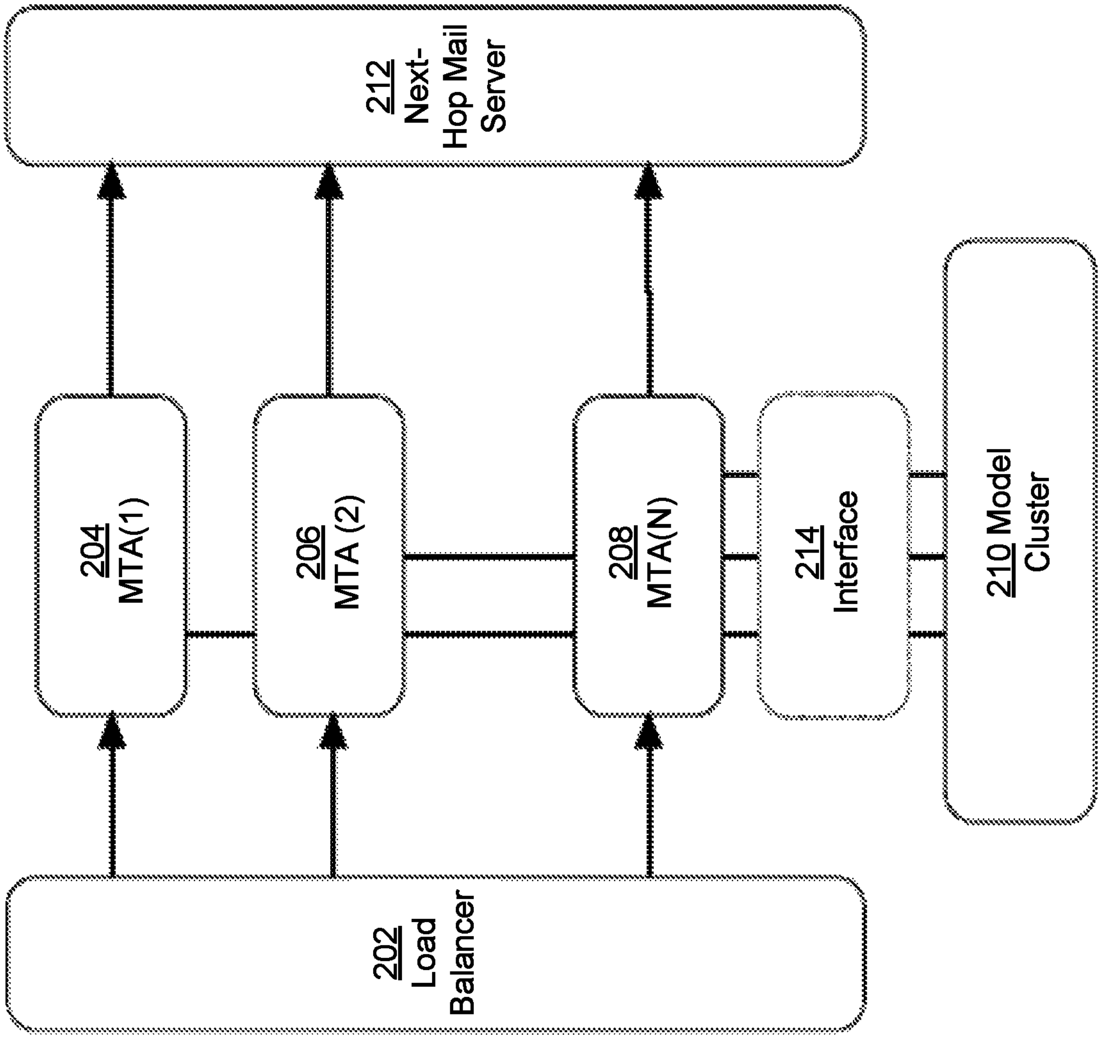
FIG. 2 illustrates an embodiment of a system architecture in which aspects of the disclosed technologies may be implemented.

FIG. 2 illustrates an embodiment of a system architecture in which aspects of the disclosed technologies may be implemented. A network 200 includes network devices 202 and 212. Network device 202 is illustratively a load balancer while network device 212 is a next-hop server such as a mail server. Network 200 may be a portion of network 120, described above.

Any number N of mail transfer applications or agents (MTAs) 204, 206, 208 are interposed between network devices 202, 212. Thus, electronic messages that are in transit from network device 202 to network device 212 are processed by one or more of MTAs 204, 206, 208 prior to delivery to network device 212. A message scanning application operated by an MTA 204, 206, 208 is programmed to perform stateless security scanning of messages received from network device 202 and prior to transmission of the messages to network device 212.

In an embodiment, interface 214 is interposed between the MTAs 204, 206, 208 and a model cluster 210. However, portions of interface 214 may be implemented within an MTA 204, 206, 208. An example of interface 214 is an application program interface (API).

Model cluster 210 may be implemented in main memory, disk storage, or other digital electronic storage on message processing server 150 and/or malicious email detection server 160 and may include one or more machine learning-based model(s) that may be selectively engaged and disengaged by interface 214 for use in connection with the stateless scanning performed by the MTAs 204, 206, 208. In an embodiment, model cluster 210 is programmed with machine learning-based model(s) used by MTAs 204, 206, 208 for many different types of message classification, including classification as spam, classification as legitimate message, classification as phishing, spoofing, or malicious, classification as "suspicious" or "important," and classification according to characteristics of the message text. In an embodiment, the message processing server 150 and the malicious email detection server 160 used to host model cluster 210 are stateless model servers.

Models in model cluster 210 are programmed using, for example, one or more text-based classification modeling approaches, such as logistic regression, random forests, gradient-boosted trees, neural networks, and deep neural networks. For instance, model cluster 210 may include models created using different modeling approaches or may include models all created using the same modeling approach but with different training data.

Interface 214, when executed by a processor, is programmed to control the selective engagement of malicious email detection server 160 by message processing server 150 in tasks performed by, or requested by, message transfer application 152. The programming of interface 214 manages and facilitates electronic communications of data and instructions between message processing server 150 and malicious email detection server 160 during the handling by message transfer application 152 of electronic messages and their respective attachments, for example messages that are being transmitted from computing device 140 to computing device 142, or from computing device 142 to computing device 140, over network 120. Interface 214 is shown as a separate component in FIG. 2 but all or portions of interface 214 may be implemented as part of message transfer application 152. Alternatively, or in addition, some portions of interface 214 may be implemented on malicious email detection server 160.

In an embodiment, the above-described technologies are used to, automatically and actively, determine that an email message should be flagged for verification and execute a verification function in response to the determination.

Figure 3:
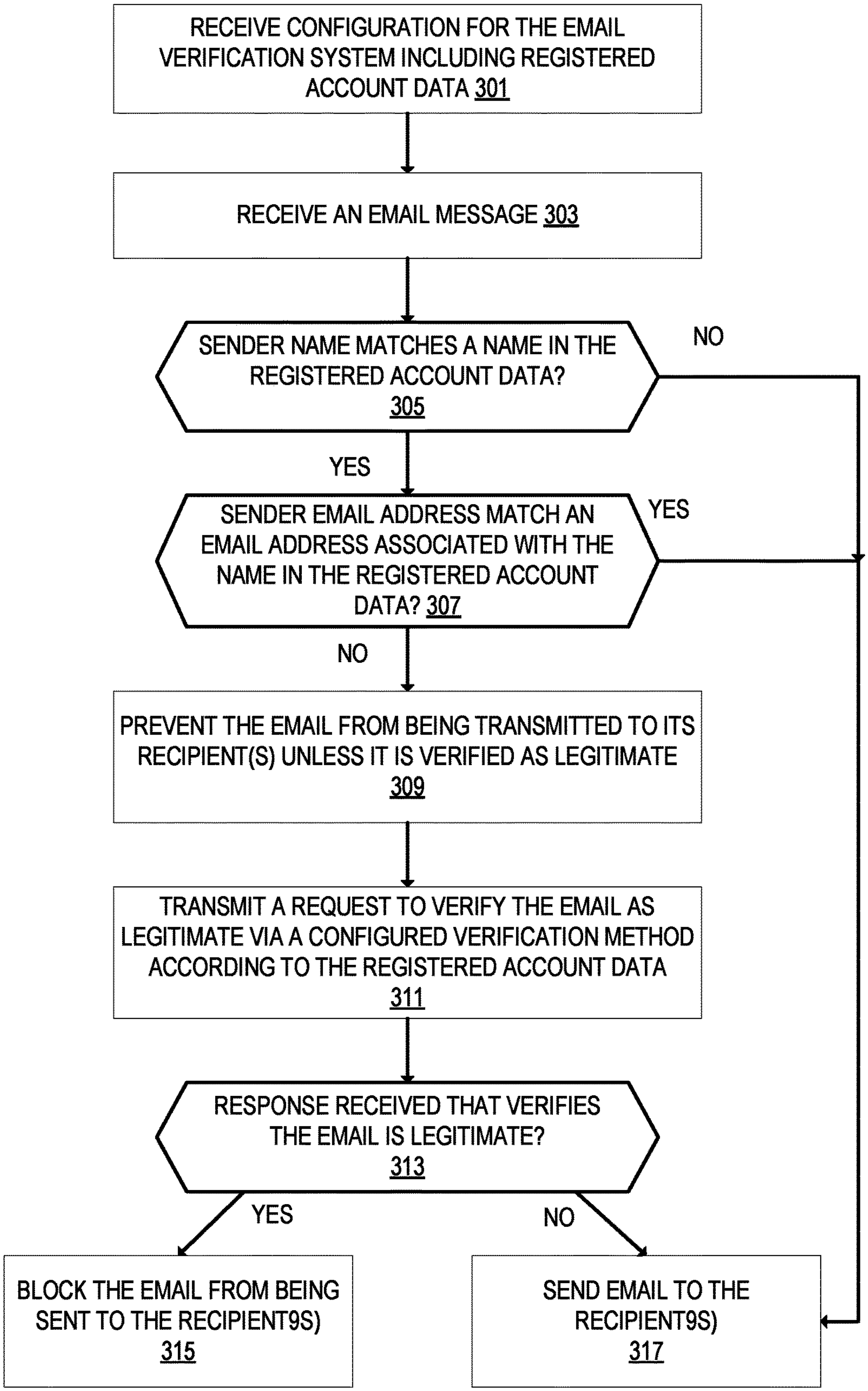
FIG. 3 illustrates exemplary operations for verifying selected inbound email according to an embodiment.

FIG. 3 illustrates exemplary operations for verifying selected inbound email according to an embodiment. The operations of FIG. 3 are described with reference to the exemplary embodiment shown in FIG. 1. However, the operations of FIG. 3 can be performed by an embodiment different from that of FIG. 1, and the embodiment of FIG. 1 can perform operations different from that of FIG. 3. The operations shown in FIG. 3 can be implemented using processor-executable instructions that are stored in computer memory. For purposes of providing a clear example, each operation of FIG. 3 can be performed by the malicious email detection server 160, the verification manager 162, and/or the message processing server 150, which may be individually or collectively referred to as the email verification system 105. Also, for clarity, the operations of FIG. 3 are described as evaluating a single email. However, like operations can be performed to evaluate multiple emails.

At operation 301, the verification manager 162 receives and stores configuration for the email verification system for an organization in the registered account data 166. The received configuration includes user account data including, for each registered account, identifying data such as a username, computer identifier, computer address, or another unique account identifier; an email address to which malicious messages to the account would be directed; and one or more preferred methods of verification. The registered account data 166 can be configured by an organization that is using the email verification system. The registered account data 166 can include account data that is internal to the organization and/or account data that is external to the organization. As an example of internal account data, the registered account data 166 may include account(s) that are associated with individual(s) that are likely to be a possible target of an attack and/or has a sensitive role at an organization. Examples of such individuals can include managers, executives, financial, legal, and/or others that have authoritative power to act on behalf of the organization. As an example of external account data, the registered account data 166 may include account(s) that are associated with individual(s) that represent vendors, suppliers, or professional services organizations, such those that are responsible for sending/receiving invoices or other important communications.

The registered account data 166 may include an approved sender list that specifies senders (e.g., the particular sender email address and/or sender domain) for which the email verification is not performed. The approved sender list may be applicable domain wide (e.g., emails received from a particular sender may be sent to all email addresses at the recipient domain without requiring verification) or to selective email addresses or groups (e.g., emails received from a particular sender may be sent to specific email address(es) at the recipient domain without requiring verification and emails received from that sender to other email address(es) at the recipient domain will require verification).

At operation 303, the verification manager 162 receives an email. The email has a sender name, a sender email address, one or more recipient names, and one or more recipient email addresses. The email may also include one or more attachments. In an embodiment, this email message may have been scanned and processed by the message processing server 150 and/or the malicious email detection server 160.

At operation 305, the verification manager 162 determines whether the sender name of the email matches a name registered in the registered account data 166. The sender name of the email may be located in the from header field of the email address. In an embodiment, the verification manager 162 determines whether there is an exact match of the sender name with a name in the registered account data 166. In another embodiment, a fuzzy name matching algorithm is used that assigns a probability to a match based on a statistical method that can detect names that are not identical but are likely to refer to the same person (e.g., Joe vs Joseph).

If the verification manager 162 determines that the sender name of the email matches a name registered in the registered account data 166, then operation 307 is performed. If the verification manager 162 determines that the sender name of the email does not match a name registered in the registered account data 166, then operation 317 is performed.

At operation 307, the verification manager 162 determines whether the sender email address matches an email address associated with the name in the registered account data 166. To provide an example, the registered account data 166 includes an account for the name John Doe with the email address johndoe@example.com. If the sender name is John Doe, the verification manager 162 determines whether the sender email address matches the email address johndoe@example.com. The verification manager 162 may compare the value of the email address in the envelope From field and/or the header From field with the email address(es) in the account. If the sender email address does not match an email address associated with the name in the registered account data 166 (this is a sender mismatch), then operation 309 is performed. If the sender email address matches an email address associated with the name in the registered account data 166, then operation 317 is performed.

At operation 309 (a sender mismatch has been detected), the verification manager 162 prevents the email from being transmitted to its recipient(s) unless it is verified as being legitimate. As an example, the verification manager 162 can cause the email to be placed into a queue for verification. The verification manager 162 may provide an output message to the MTA 152 to cause the email to be placed into a queue and/or to execute one or more of the verification functions 154. The output message may indicate which verification function to perform based on the configured verification method(s) for the account in the registered account data 166.

At operation 311, the MTA 152, using a configured verification method according to the registered account data, transmits a request to verify the email as legitimate. The verification request may be sent via a text message, a phone call, an email (e.g., the email address associated with the registered name that matches the sender name of the email or a different email address that belongs to an authorized user), or a verification application, as configured for the account. The request to verify the email may include various information about the email including one or more of: the sending IP address, the sending autonomous system number (ASN), the value in the envelope From field, the recipient(s) email address(es), the date and time of the email, the subject of the email, whether the email passed DMARC, attachment name(s), and model scoring. The request to verify may include a preview of the email content. The request may include a way for the recipient to verify the email as legitimate and/or indicate that the email is illegitimate.

The verification request is submitted according to the registered account data. The verification request can be sent to a user that is authorized to verify emails. For example, a user account may be designated with authority to verify emails including invoices, confidential information, or other email (e.g., a sender mismatch) even if the email is not purported to be sent by, or sent to, that user account. The verification request can be sent to a user that is associated with the mismatch. As an example, in the case of a sender mismatch, the verification request can be sent to the account associated with the registered name that corresponds to the sender name of the email. The verification request is not sent to the original sender who may be an attacker.

At operation 313, the MTA 152 determines whether it has received a response that verifies that the email is legitimate. A response may be received that affirmatively verifies that the email is legitimate or affirmatively indicates that the email is illegitimate. In some embodiments, when a response that verifies that the email is legitimate is not received by the MTA 152 within a set period of time after being sent, the MTA 152 may be programmed to determine the response to the request as non-responsive and further determine that verification has failed. If the MTA 152 does not receive a response that verifies that the email is legitimate, then operation 315 is performed. If the MTA 152 receives a response that verifies that the email is legitimate, then operation 317 is performed.

At operation 315, the MTA 152 blocks the email from being sent to its intended recipient(s). Alternatively, or in addition, the MTA 152 may delay the message from being sent or quarantine the message. At operation 317, the MTA 152 transmits the email to the intended recipient(s). For example, the MTA 152 can forward the email to a next-hop router or other downstream computer or element of network infrastructure gear.

In an embodiment, the verification operations of FIG. 3 are not performed if the sender is on an approved sender list (e.g., the particular sender email address and/or the sender domain). The approved sender list may be applicable domain wide (e.g., emails received from a particular sender may be sent to all email addresses at the recipient domain without requiring verification) or to selective email addresses or groups (e.g., emails received from a particular sender may be sent to specific email address(es) at the recipient domain without requiring verification and emails received from that sender to other email address(es) at the recipient domain will require verification). For instance, if the email address john.doe@example2.com is on an approved sender list, an email with the sender name of John Doe (matching a registered sender name) with the sender email address being john.doe@example2.com, the email may be delivered to the intended recipient without requiring verification. As another example, if the email address vendor@example3.com is on an approved sender list, an email from that email address may be sent to the intended recipient without verification even if that email includes an invoice, confidential information, and/or other other matches against prescribed patterns or models. In an embodiment, after verifying an email, the sender email address may be added to the approved sender list automatically or by configuration of the verifier.

FIG. 3 described a sender mismatch. It is possible that there may be multiple people that have the same or similar names. For example, there may be two John Does in the organization. In such a case of a sender mismatch, a verification request may be sent to both of the John Does and if one of them affirmatively responds that the incoming email is legitimate, then that sender email address may be associated with that particular John Doe.

Figure 4:
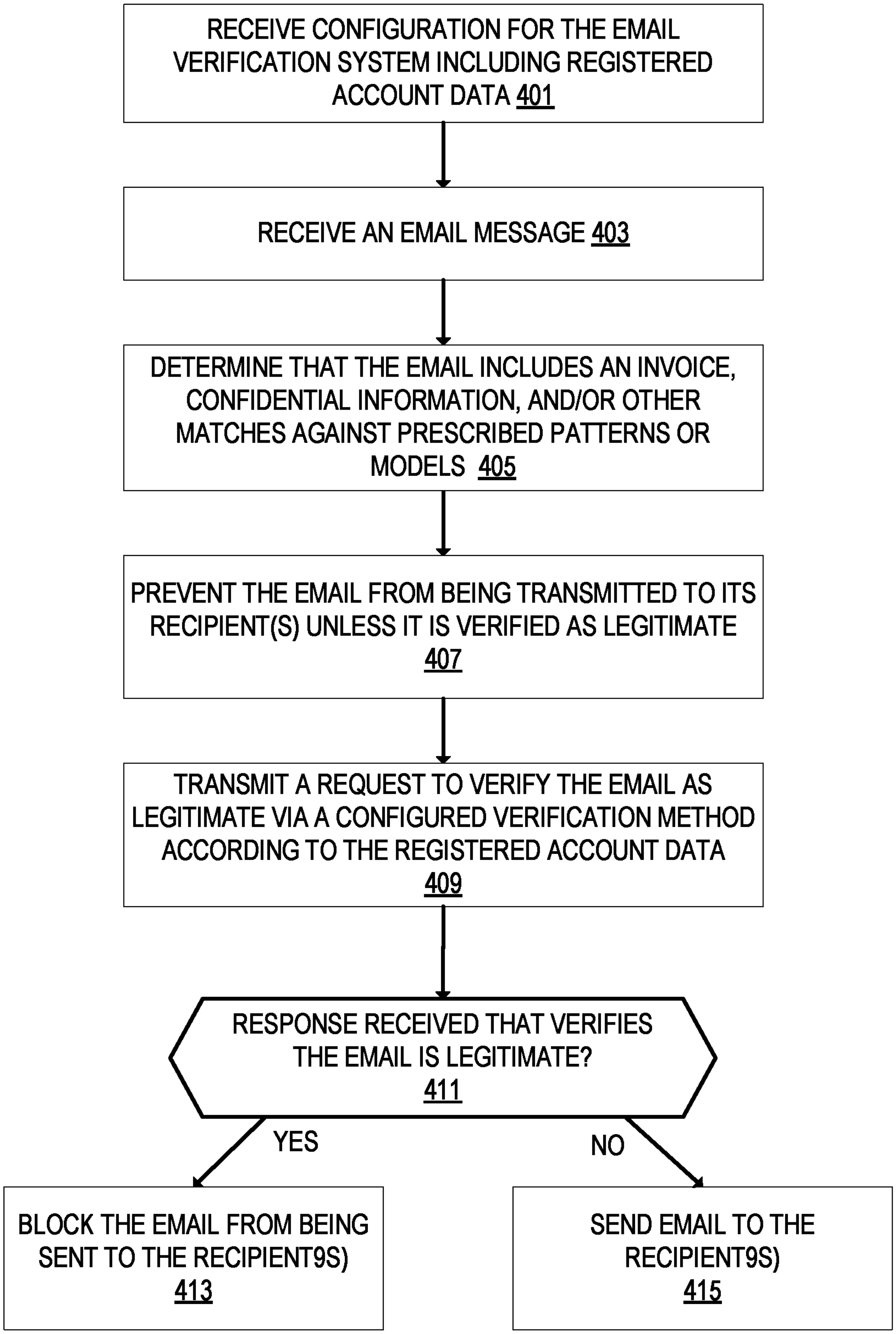
FIG. 4 is a flow diagram that illustrates exemplary operations for verifying selected inbound email according to an embodiment.

FIG. 4 is a flow diagram that illustrates exemplary operations for verifying selected inbound email according to an embodiment. The operations of FIG. 4 are described with reference to the exemplary embodiment shown in FIG. 1. However, the operations of FIG. 4 can be performed by an embodiment different from that of FIG. 1, and the embodiment of FIG. 1 can perform operations different from that of FIG. 4. The operations shown in FIG. 4 can be implemented using processor-executable instructions that are stored in computer memory. For purposes of providing a clear example, each operation of FIG. 4 can be performed by the malicious email detection server 160, the verification manager 162, and/or the message processing server 150, which may be individually or collectively referred to as the email verification system 105. Also, for clarity, the operations of FIG. 4 are described as evaluating a single email. However, like operations can be performed to evaluate multiple emails.

At operation 401, the verification manager 162 receives and stores configuration for the email verification system for an organization in the registered account data 166. The received configuration includes user account data including, for each registered account, identifying data such as a username, computer identifier, computer address, or another unique account identifier; an email address to which malicious messages to the account would be directed; and one or more preferred methods of verification. The registered account data 166 can be configured by an organization that is using the email verification system. The registered account data 166 can include account data that is internal to the organization and/or account data that is external to the organization. As an example of internal account data, the registered account data 166 may include account(s) that are associated with individual(s) that are likely to be a possible target of an attack and/or has a sensitive role at an organization. Examples of such individuals can include managers, executives, financial, legal, and/or others that have authoritative power to act on behalf of the organization. As an example of external account data, the registered account data 166 may include account(s) that are associated with individual(s) that represent vendors, suppliers, or professional services organizations, such those that are responsible for sending/receiving invoices or other important communications.

The registered account data 166 may include an approved sender list that specifies senders (e.g., the particular sender email address and/or sender domain) for which the email verification is not performed. The approved sender list may be applicable domain wide (e.g., emails received from a particular sender may be sent to all email addresses at the recipient domain without requiring verification) or to selective email addresses or groups (e.g., emails received from a particular sender may be sent to specific email address(es) at the recipient domain without requiring verification and emails received from that sender to other email address(es) at the recipient domain will require verification).

At operation 403, the verification manager 162 receives an email. The email has a sender name, a sender email address, one or more recipient names, and one or more recipient email addresses. The email may also include one or more attachments. In an embodiment, this email message may have been scanned and processed by the message processing server 150 and/or the malicious email detection server 160.

At operation 405, the verification manager 162 determines that the email includes an invoice (or purportedly includes an invoice), confidential information (e.g., a confidential document or other confidential information), and/or other matches against prescribed patterns or models. In an embodiment, the verification manager 162 may include a scanning engine with a set of rules to detect the presence of an invoice (or attachment that is purportedly an invoice), confidential information and/or other matches against prescribed patterns or models. For example, the rules may be an incoming email from outside the organization, that has less than N number of attachments (e.g., less than 5 number of attachments), and at least one attachment has a predefined word (e.g., invoice) in the file name. These rules may be configurable by the organization and may define what term(s) that are sensitive or otherwise identify confidential information.

Next, after determining that the email includes an invoice (or purportedly includes an invoice), confidential information (e.g., a confidential document or other confidential information), and/or other matches against prescribed patterns or models, the verification manager 162 prevents the email from being transmitted to its recipient(s) unless it is verified as being legitimate at operation 407. As an example, the verification manager 162 can cause the email to be placed into a queue for verification. The verification manager 162 may provide an output message to the MTA 152 to cause the email to be placed into a queue and/or to execute one or more of the verification functions 154. The output message may indicate which verification function to perform based on a configured verification method(s) in the registered account data 166. For example, a user account may be designated with authority to verify emails including invoices, confidential information, and/or other matches against prescribed patterns or models.

Next, at operation 409, the MTA 152, using a configured verification method according to the registered account data, transmits a request to verify the email as legitimate. The verification request may be sent via a text message, a phone call, an email (e.g., an email address to an authorized user), or a verification application, as configured for the account. The request to verify the email may include various information about the email including one or more of: the sending IP address, the sending autonomous system number (ASN), the value in the envelope From field, the recipient(s) email address(es), the date and time of the email, the subject of the email, whether the email passed DMARC, attachment name(s), and model scoring. The request to verify may include a preview of the email content. The request may include a way for the recipient to verify the email as legitimate and/or indicate that the email is illegitimate.

The verification request is submitted according to the registered account data. The verification request can be sent to a user that is authorized to verify emails. For example, a user account may be designated with authority to verify emails including invoices, confidential information, or other email (e.g., a sender mismatch) even if the email is not purported to be sent by, or sent to, that user account. The verification request is not sent to the original sender who may be an attacker.

At operation 411, the MTA 152 determines whether it has received a response that verifies that the email is legitimate. A response may be received that affirmatively verifies that the email is legitimate or affirmatively indicates that the email is illegitimate. In some embodiments, when a response that verifies that the email is legitimate is not received by the MTA 152 within a set period of time after being sent, the MTA 152 may be programmed to determine the response to the request as non-responsive and further determine that verification has failed. If the MTA 152 does not receive a response that verifies that the email is legitimate, then operation 413 is performed. If the MTA 152 receives a response that verifies that the email is legitimate, then operation 415 is performed.

At operation 413, the MTA 152 blocks the email from being sent to its intended recipient(s). Alternatively, or in addition, the MTA 152 may delay the message from being sent or quarantine the message. At operation 415, the MTA 152 transmits the email to the intended recipient(s). For example, the MTA 152 can forward the email to a next-hop router or other downstream computer or element of network infrastructure gear.

In an embodiment, the verification operations of FIG. 4 are not performed if the sender is on an approved sender list (e.g., the particular sender email address and/or the sender domain). The approved sender list may be applicable domain wide (e.g., emails received from a particular sender may be sent to all email addresses at the recipient domain without requiring verification) or to selective email addresses or groups (e.g., emails received from a particular sender may be sent to specific email address(es) at the recipient domain without requiring verification and emails received from that sender to other email address(es) at the recipient domain will require verification). For instance, if the email address john.doe@example2.com is on an approved sender list, an email with the sender name of John Doe (matching a registered sender name) with the sender email address being john.doe@example2.com, the email may be delivered to the intended recipient without requiring verification. As another example, if the email address vendor@example3.com is on an approved sender list, an email from that email address may be sent to the intended recipient without verification even if that email includes an invoice, confidential information, and/or other other matches against prescribed patterns or models. In an embodiment, after verifying an email, the sender email address may be added to the approved sender list automatically or by configuration of the verifier.

The email verification described herein can be performed in addition to other mechanisms for determining whether an email is malicious such as classifying spam, spoofing, and/or phishing emails. For instance, the MTA 152 may perform an SPF, DKIM, and/or DMARC check on incoming email. An email may pass these checks but still fail the verification described herein.

Methods of performing verification can incorporate specified constraints. For example, a particular verification method could be an SMS message that must receive a specified form or kind of response, a special application on a cellular phone that has facilities for messages that must be acknowledged, or custom hardware devices that can display a message for acknowledgement.

An MTA or other trusted gateway that is programmed to scan, identify suspicious and important emails, potentially hold the messages, and use a verification mechanism before delivery or to modify delivery, represents a distinct advance of the art as past known solutions have not provided an MTA or other trusted gateway, email scanning for potential to need verification, and verification. The processes disclosed herein concerning how and when to delay email for further verification, with novel algorithms and heuristics to scan email with an eye towards verification, also represent an advance in the art. A system to capture registration details for key accounts or individuals who should authorize certain categories of email also provides a distinct advance in part by associating verification with accounts or individuals who are more likely to be targets of phishing or malicious email campaigns. Reliable mechanisms to verify email provide a distinct advance in the art of message security and provide an MTA or other trusted gateway with new techniques to improve resistance to specified kinds of attacks.

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices such as a display device 512. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to the I/O subsystem 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Embodiments provide the benefits and improvements of automatically and actively, determining that an email message should be flagged for verification and executing a verification process in response to the determination, that otherwise was not possible with prior technology. The technical benefits disclosed by embodiments allow a mail transfer agent, firewall, email server, or other computing hardware that is protected according to the disclosure to use fewer resources including CPU cycles, memory, storage, and/or network bandwidth by providing a more efficient technique that improves email security during the transit of an email through a network.

The disclosure to this point has explained that a message processing server can execute a set of steps to provide additional security for emails being transmitted through a network. Email scams, or malicious emails, are extremely difficult to detect even with the complex, sophisticated methods out there, and there are abundance of malicious actors that are financially motivated to exploit unsuspecting individuals, employees, and executives of an organization into making payments or sending sensitive data to fraudulent accounts. As a solution to such an issue, embodiments disclosed herein disclose a message processing server executing a verification process while an email message is in transit through a network, for example, while an email message being transmitted from a sender computer to a recipient computer. For example, embodiments disclose a method by which a message processing server acts as a trusted gateway to scan and look for selected emails and execute a verification mechanism before delivery to a recipient computer. Such a technique of executing verification during a transition of an email through a network (for example, MTAs) has not been created before. Moreover, the combination of the concepts of using messaging processing servers as trusted gateways, email scanning for potential to need verification, and verification has not been tried before, certainly not in a reliable way as presented by the embodiments disclosed herein. Moreover, embodiments disclose technical improvements in the field of email security management by providing a reliable mechanism to verify emails prior to being delivered to a recipient by, for example, having certain key individuals to verify certain categories of email that has not been seen by the system before. In particular, embodiments provide a technical improvement in the field of email security by providing an additional verification method for verifying email messages through client devices that have been registered with a system, such as a malicious email detection server or message processing server disclosed herein, rather than verifying the email messages through email addresses indicated in such email messages. Verifying email messages through registered devices provide additional security since such registered devices are associated with a higher trust factor than the email messages themselves.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

Implemented in the computing devices and servers described herein, using computer software, hardware, or software and hardware, are processor-executable instructions, data structures, and digital data, stored in memory, which cooperate to provide the computer-implemented functionality described herein. For purposes of illustrating a clear example, these computer-implemented components are represented schematically in the figures.

"System" as used herein may refer to a single computer or network of computers and/or other devices. "Computer" or "computing device" as used herein may refer to a computer or any other electronic device that is equipped with a processor. "Processor" as used herein may refer to a software or hardware processor. "Instructions" or "application" as used herein may refer to one or more sets of computer program instructions; in all cases, elements of instructions are capable of computer execution or evaluation to generate output based upon a computer transformation of an input dataset into different digitally stored, electronic data.

"Model" as used herein may refer to one or more sets of computer program instructions and datasets that collectively define representations data, relationships between data or rules or transformations of other data. For example, a model is capable of computer execution or evaluation to generate output that indicates a probabilistic or statistical likelihood that an input or a set of inputs is associated with a particular class, category, type or other characterization.

Although the email verification system 105 may be implemented with any number of the described components, in this disclosure, these elements may be referred to in the singular form for ease of discussion. Also, while the described computer components are shown as separate elements in the drawings, the illustrations are not meant to imply that separation of these elements is required. The illustrated components may be divided over any number of physical systems or may be contained in a single physical computer system and can communicate with each other in any appropriate manner.

In an embodiment, the message processing server 150 and the malicious email detection server 160 are each a server-side computing device such as a server computer or a cluster or network of server computers accessible by the Internet, for example in a public or private cloud. In some embodiments, the message processing server 150 and the malicious email detection server 160 are the same group of computers or are part of the same computer system. As illustrated in FIG. 1, each of display devices 170, 172 is implemented as part of a computing device 140, 142, respectively, but may be implemented as a separate device or as part of another device, or as multiple networked display devices, in other implementations. Portions of processing described as performed by the message processing server 150 and the malicious email detection server 160 may in some embodiments, be performed by one or more of computing devices 140, 142.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of providing secure transition of an electronic digital message being transmitted between a sender computer and a recipient computer. All embodiments of the claims are directed to stored program digital computers, and computer-executed operating methods, that act to admit or deny admission of specified kinds of digital electronic email messages to, toward, or through computer networks, firewalls, routers, switches, server computers, or end-user computing devices, using digital electronic means. The admission or blockage of a digital electronic email message in connection with networking gear using the means set forth herein is not capable of human performance. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the preceding description, for the purposes of explanation, numerous specific details are set forth to provide a thorough understanding of embodiments. It will be apparent, however, that embodiments may be practiced without these specific details. In other instances, well-known structures and devices are shown in block diagram form to avoid unnecessarily obscuring understanding.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein While the flow diagrams in the figures show a particular order of operations performed by certain embodiments, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:

storing, at an email verification system, configuration for the email verification system including one or more configured verification methods, the email verification system including a mail transfer agent (MTA) operating as a trusted gateway between upstream computers and downstream computers;

receiving, at the MTA of the email verification system, a first email having a first sender name, a first sender email address, one or more first recipient names, and one or more first recipient email addresses;

analyzing, by the MTA, the first email to determine whether it matches a prescribed pattern or model;

responsive to the first email matching the prescribed pattern or model, placing the first email into a verification queue to prevent the first email from being transmitted to the one or more first recipient email addresses at a first downstream computer unless the first email is verified as legitimate;

transmitting a first request to verify the first email as being legitimate via a first configured verification method of the one or more configured verification methods, wherein the first configured verification method requests a first recipient of the first request to verify whether the first email is legitimate, and wherein the first request is not sent to the first sender email address;

receiving a first response to the first request that includes an indication from the first recipient of the first request that verifies the first email as being legitimate;

transmitting the first email to the one or more first recipient email addresses at the first downstream computer responsive to receiving the first response;

receiving, at the MTA of the email verification system, a second email having a second sender name, a second sender email address, one or more second recipient names, and one or more second recipient email addresses;

analyzing, by the MTA, the second email to determine whether it matches the prescribed pattern or model;

responsive to the second email matching the prescribed pattern or model, placing the second email into the verification queue to prevent the second email from being transmitted to the one or more second recipient email addresses at a second downstream computer unless the second email is verified as legitimate;

transmitting a second request to verify the second email as being legitimate via a second configured verification method of the one or more configured verification methods, wherein the second configured verification method requests a second recipient of the second request to verify whether the second email is legitimate, wherein the second request is not sent to the second sender email address;

receiving a second response to the second request that includes an indication that the second email is not legitimate; and blocking the second email from being sent to the one or more second recipient email addresses at the second downstream computer.

2. The method of claim 1, wherein the first request to verify the first email as being legitimate includes one or more of: an IP address of the first email, an autonomous system number (ASN) of the first email, a value in an envelope from field of the first email, a date and time of the first email, and a subject of the first email.

3. The method of claim 1, wherein the first configured verification method is one of: email verification, text message verification, authentication application verification, and phone call verification.

4. The method of claim 1, wherein the first request to verify the first email as being legitimate includes a third email being sent to the first email address.

5. The method of claim 1, wherein the first email further includes an attachment, and wherein analyzing the first email to determine whether the first email matches the prescribed pattern or model includes analyzing the attachment to determine whether it matches the prescribed pattern or model.

6. The method of claim 5, wherein analyzing the attachment results in a determination that the attachment is an invoice or purportedly an invoice.

7. The method of claim 1, wherein the configuration for the email verification system further includes a set of one or more rules to detect the presence of confidential information, and wherein analyzing the first email includes applying the set of one or more rules to the first email and determining that the first email contains confidential information.

8. The method of claim 1, wherein the first request and the second request are transmitted to a user that is authorized to verify emails.

9. A non-transitory computer-readable storage medium that provides instructions that, if executed by a processor, will cause said processor to perform operations comprising:

storing, at an email verification system, configuration for the email verification system including one or more configured verification methods, the email verification system including a mail transfer agent (MTA) operating as a trusted gateway between upstream computers and downstream computers;

receiving, at the MTA of the email verification system, a first email having a first sender name, a first sender email address, one or more first recipient names, and one or more first recipient email addresses;

analyzing, by the MTA, the first email to determine whether it matches a prescribed pattern or model;

responsive to the first email matching the prescribed pattern or model, placing the first email into a verification queue to prevent the first email from being transmitted to the one or more first recipient email addresses at a first downstream computer unless the first email is verified as legitimate;

transmitting a first request to verify the first email as being legitimate via a first configured verification method of the one or more configured verification methods, wherein the first configured verification method requests a first recipient of the first request to verify whether the first email is legitimate, and wherein the first request is not sent to the first sender email address;

receiving a first response to the first request that includes an indication from the first recipient of the first request that verifies the first email as being legitimate;

transmitting the first email to the one or more first recipient email addresses at the first downstream computer responsive to receiving the first response;

receiving, at the MTA of the email verification system, a second email having a second sender name, a second sender email address, one or more second recipient names, and one or more second recipient email addresses;

analyzing, by the MTA, the second email to determine whether it matches the prescribed pattern or model;

responsive to the second email matching the prescribed pattern or model, placing the second email into the verification queue to prevent the second email from being transmitted to the one or more second recipient email addresses at a second downstream computer unless the second email is verified as legitimate;

transmitting a second request to verify the second email as being legitimate via a second configured verification method of the one or more configured verification methods, wherein the second configured verification method requests a second recipient of the second request to verify whether the second email is legitimate, wherein the second request is not sent to the second sender email address;

receiving a second response to the second request that includes an indication that the second email is not legitimate; and blocking the second email from being sent to the one or more second recipient email addresses at the second downstream computer.

10. The non-transitory computer-readable storage medium of claim 9, wherein the first request to verify the first email as being legitimate includes one or more of: an IP address of the first email, an autonomous system number (ASN) of the first email, a value in an envelope from field of the first email, a date and time of the first email, and a subject of the first email.

11. The non-transitory computer-readable storage medium of claim 9, wherein the first configured verification method is one of: email verification, text message verification, authentication application verification, and phone call verification.

12. The non-transitory computer-readable storage medium of claim 9, wherein the first request to verify the first email as being legitimate includes a third email being sent to the first email address.

13. The non-transitory computer-readable storage medium of claim 9, wherein the first email further includes an attachment, and wherein analyzing the first email to determine whether the first email matches the prescribed pattern or model includes analyzing the attachment to determine whether it matches the prescribed pattern or model.

14. The non-transitory computer-readable storage medium of claim 13, wherein analyzing the attachment results in a determination that the attachment is an invoice or purportedly an invoice.

15. The non-transitory computer-readable storage medium of claim 9, wherein the configuration for the email verification system further includes a set of one or more rules to detect the presence of confidential information, and wherein analyzing the first email includes applying the set of one or more rules to the first email and determining that the first email contains confidential information.

16. The non-transitory computer-readable storage medium of claim 9, wherein the first request and the second request are transmitted to a user that is authorized to verify emails.

17. An apparatus, comprising:

a processor; and a non-transitory computer-readable storage medium that provides instructions that, if executed by the processor, will cause the apparatus to perform the following operations:

storing, at an email verification system, configuration for the email verification system including one or more configured verification methods, the email verification system including a mail transfer agent (MTA) operating as a trusted gateway between upstream computers and downstream computers;

receiving, at the MTA of the email verification system, a first email having a first sender name, a first sender email address, one or more first recipient names, and one or more first recipient email addresses;

analyzing, by the MTA, the first email to determine whether it matches a prescribed pattern or model;

responsive to the first email matching the prescribed pattern or model, placing the first email into a verification queue to prevent the first email from being transmitted to the one or more first recipient email addresses at a first downstream computer unless the first email is verified as legitimate;

transmitting a first request to verify the first email as being legitimate via a first configured verification method of the one or more configured verification methods, wherein the first configured verification method requests a first recipient of the first request to verify whether the first email is legitimate, and wherein the first request is not sent to the first sender email address;

receiving a first response to the first request that includes an indication from the first recipient of the first request that verifies the first email as being legitimate;

transmitting the first email to the one or more first recipient email addresses at the first downstream computer responsive to receiving the first response;

receiving, at the MTA of the email verification system, a second email having a second sender name, a second sender email address, one or more second recipient names, and one or more second recipient email addresses;

analyzing, by the MTA, the second email to determine whether it matches the prescribed pattern or model;

responsive to the second email matching the prescribed pattern or model, placing the second email into the verification queue to prevent the second email from being transmitted to the one or more second recipient email addresses at a second downstream computer unless the second email is verified as legitimate;

transmitting a second request to verify the second email as being legitimate via a second configured verification method of the one or more configured verification methods, wherein the second configured verification method requests a second recipient of the second request to verify whether the second email is legitimate, wherein the second request is not sent to the second sender email address;

receiving a second response to the second request that includes an indication that the second email is not legitimate; and blocking the second email from being sent to the one or more second recipient email addresses at the second downstream computer.

18. The apparatus of claim 17, wherein the first request to verify the first email as being legitimate includes one or more of: an IP address of the first email, an autonomous system number (ASN) of the first email, a value in an envelope from field of the first email, a date and time of the first email, and a subject of the first email.

19. The apparatus of claim 17, wherein the first configured verification method is one of: email verification, text message verification, authentication application verification, and phone call verification.

20. The apparatus of claim 17, wherein the first request to verify the first email as being legitimate includes a third email being sent to the first email address.

21. The apparatus of claim 17, wherein the first email further includes an attachment, and wherein analyzing the first email to determine whether the first email matches the prescribed pattern or model includes analyzing the attachment to determine whether it matches the prescribed pattern or model.

22. The apparatus of claim 21, wherein analyzing the attachment results in a determination that the attachment is an invoice or purportedly an invoice.

23. The apparatus of claim 17, wherein the configuration for the email verification system further includes a set of one or more rules to detect the presence of confidential information, and wherein analyzing the first email includes applying the set of one or more rules to the first email and determining that the first email contains confidential information.

24. The apparatus of claim 17, wherein the first request and the second request are transmitted to a user that is authorized to verify emails.

* * * * *